Feb. 10, 1959 R. O. YAVNE 2,872,809
METHOD FOR DETERMINING ANGLES OF ATTACK AND SKID OF AN AIRCRAFT
Filed Aug. 6, 1956 2 Sheets-Sheet 1
Fig. 1
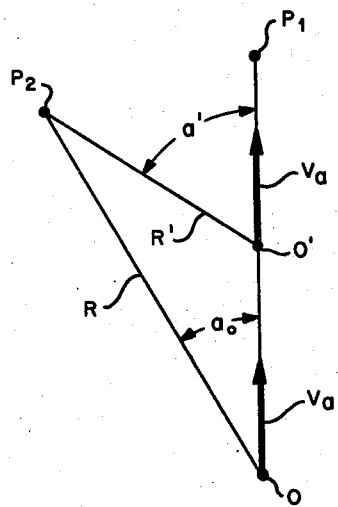
Fig. 2
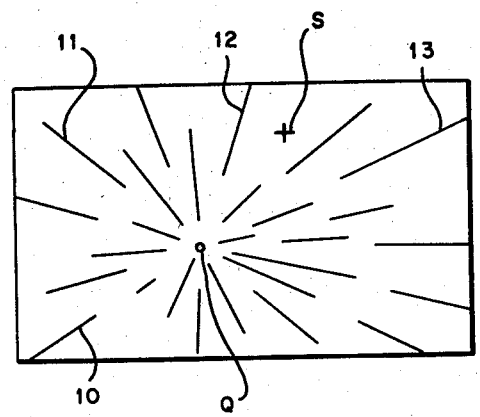
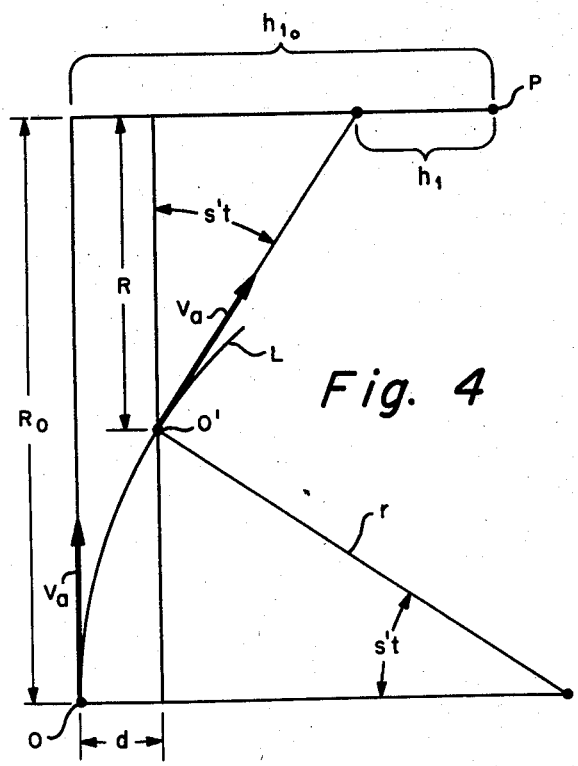
Fig. 4
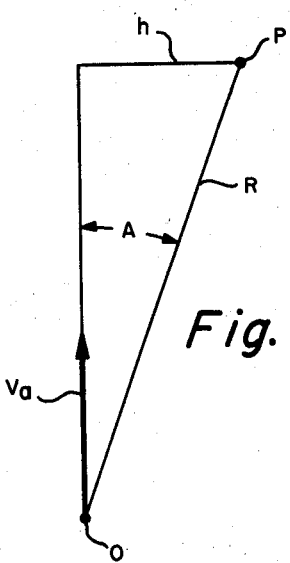
Fig. 3
INVENTOR.
RAPHAEL O. YAVNE
BY
ATTORNEYS Feb. 10, 1959　　　　R. O. YAVNE　　　　2,872,809
METHOD FOR DETERMINING ANGLES OF ATTACK AND SKID OF AN AIRCRAFT
Filed Aug. 6, 1956　　　　　　　　　　　　2 Sheets-Sheet 2

INVENTOR.
RAPHAEL O. YAVNE
BY
ATTORNEYS

United States Patent Office 2,872,809
Patented Feb. 10, 1959

2,872,809

METHOD FOR DETERMINING ANGLES OF ATTACK AND SKID OF AN AIRCRAFT

Raphael O. Yavne, Philadelphia, Pa.

Application August 6, 1956, Serial No. 602,478

10 Claims. (Cl. 73—180)

(Granted under Title 35, U. S. Code (1952), sec. 266)

The invention described herein may be manufactured and used by or for the Government of the United States of America for governmental purposes without the payment of any royalties thereon or therefor.

The invention relates to a method of determining angles of attack and skid of an aircraft and more particularly to a method of determining angles of attack and skid in an aircraft utilizing a camera focused at a fixed point in space rather than at infinity and relying on the indication of relative motion of particles instead of upon a reference which is fixed in space.

Present techniques for determining the angles of attack and skid of an aircraft include the horizon and the double horizon methods. The common drawbacks of these methods are the restrictions which require the airplane to be in a straight and level flight and at a low altitude.

With the recent development of various instruments for measuring angles of attack and skid it has become even more important to have an accurate method for determining these angles in order to calibrate these instruments and check their accuracy and reliability under various flight conditions. The present invention utilizes the known phenomenon which occurs when an observer is moving through a medium of particles suspended in space. Under certain illuminated conditions, to such an observer the particles seem to radiate in all directions from a certain center. In fact, when the particles are suspended in space this center lies in the direction of the observer's motion through the space. Displacement of this center from a point on the particular axis of the aircraft from which the angles of attack and skid are measured indicates these angles directly.

An object of the present invention is the provision of a method for determining the angles of attack and skid of an aircraft by utilizing the phenomenon of the apparent radiation of particles when an observer is moving through a medium of particles suspended in space.

Another object is to provide a method for determining the angles of attack and skid of an aircraft by flying the aircraft through an area having particles suspended therein and comparing the apparent center of radiation of said particles with the axis of the aircraft from which the angles of attack and skid are measured and utilizing these deviations for calculating said angles of attack and skid.

A further object of the invention is the provision of a method of determining the angles of attack and skid of an aircraft by flying an aircraft through a medium or area having particles suspended therein, photographing said particles over a predetermined period of time, superimposing a point showing the bore-sight-datum-line of the airplane, and utilizing the photographic results to measure the distances between the apparent centers of radiation of said particles and said datum line to determine the angles of attack and skid, respectively, of the aircraft.

The exact nature of this invention as well as other objects and advantages thereof will be readily apparent from consideration of the following specification relating to the annexed drawing in which:

Fig. 1 shows schematically how the radiation effect is caused by an observer moving through a medium with a plurality of particles suspended therein.

Fig. 2 shows a typical film record which would be taken by the observer passing through a medium such as illustrated in Fig. 1.

Fig. 3 shows how a general particle is "seen" by the camera in the airplane.

Fig. 4 shows the geometry involved when the particles are stationary and the airplane is flying with a constant speed and turning with a constant angular rate.

Figure 7:
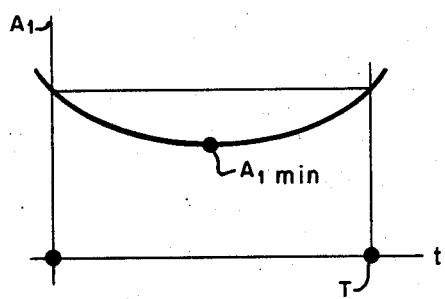
Fig. 7 shows a rough graph of the variation of the sighting angle of a particle with time where $A_{1_0}=A_{1_T}$.

The proposed method utilizes the known phenomenon which occurs when an obserper is moving through a medium of particles suspended in space. Under certain illuminating conditions, to such an observer the particles seem to radiate in all directions from a certain center. A person driving through a falling snow approximates such a condition. It can be shown that the imaginary center from where the particles seem to diverge points toward the observer's actual heading relative to the particles.

This phenomenon, that the imaginary center points toward the observer's motion through space, may be shown by reference to Fig. 1. The radiation effect results from the fact that the angle at which an observer is looking at a given particle is constantly increasing. For example, an observer at point O sees particle $P_2$ at an angle $a_0$. The observer is moving along a line toward the particle $P_1$, at a velocity of $V_a$. When the observer reaches point $O'$ after a finite interval of time, the angle at which he sees particle $P_2$ had increased to angle $a'$.

Mathematically, the rate of change is in angle $a$ for stationary particles is given:

(1)  $$\frac{da}{dt}=\frac{V_a \sin a}{R}$$

where R is the distance to the particle from the observer.

For small angles of $a$ this can be approximately as follows:

(2)  $$\Delta a=\frac{V_a \Delta t}{R-V_a \Delta t} \cdot a$$

As seen from (2), the incremental change in angle $a$ is directly proportional to $a$ for small angles of $a$. Thus, for angles of $a$ approaching zero, that is, for particles close to the flight path, the tracking distance left by the particles over some period of time would approach zero length. This phenomenon is shown in Fig. 2 which illustrates a picture taken by a camera over a finite period of exposure. Point Q represents the center from which the particles seem to radiate and it is seen that the various streaks, 10, 11, 12, 13, etc. become longer the farther away they are from Q, or, in other words, the greater the angle $a$. Reticle S represents a point on the bore-sight-datum line of the aircraft from which the angles of attack and skid are measured. The elevation distance between points S and Q would be directly proportional to the angle of attack of the aircraft while the transverse separation of the points would represent the angle of skid.

In the practical application of the principles of this invention for measuring the angles of attack and skid of an aircraft, the preceding discussion has assumed that the particles suspended in space are not moving in the medium. In the more usual case where relative movement of the particles in space occurs or where the airplane is turning during the interval the camera is recording the streaks, the center Q of the particles shown in Fig. 2 will be displaced from the flight path of the aircraft. This deviation represents an error which must be corrected for.

Analysis reveals that four general cases cover all situations including the various sources of error and the perfect case where no error arises. These may be taken in turn to develop a correction factor applicable to each situation.

In the following discussion, the angles between the airplane flight path and the lines along which the particles are "seen" by the camera are assumed to be small and are treated as vectors projected on the photographic film. Also, the lines and tangents of the angles are assumed to be equal to their respective angles and the cosine equal to unity.

CASE I

The particles are stationary in space and the airplane flies with a constant speed and does not turn.

Referring to Fig. 3, $V_a$ is the airplane's speed
P is the particle
$h$ is the distance of the particle from the airplane speed vector
R is the distance from the airplane to the particle
A is the sighting angle of the particle By inspection, (3) $$\frac{h}{R} = A$$

Let (4) $$R' = -V_a$$

Integrating (4), (5) $$R = R_0 - V_a t$$

where $t$ is the time elapsed from the beginning of the exposure for the given frame, and $R_0$ is the distance from the airplane to the particle at the start of the exposure of that frame. In general, the subscript zero relates each variable to its value at the start of the exposure of the given frame. $h$ is a constant for each particle since the particles do not move in space and the airplane is flying straight.

Therefore:

(6) $$h = h_0$$

And (7) $$A = \frac{h}{R} = \frac{h_0}{R_0 - V_a t}$$

From Equation 7 it is seen that A is increasing in time at a rate which is proportional to $h_0$ for each particular particle. On the film, the tracings will converge to the point $h_0 = 0$ as seen in Fig. 2. For $h_0 = 0$, angle A is equal to zero during the whole exposure time, as seen from (7). Since the center of all the lines is at $h_0 = 0$ and is on the flight path, no correction will be necessary when this center point is used in measuring the angles of attack and skid from the reference point.

CASE II

The particles are moving with a constant speed in space and the airplane flies with a constant speed without turning.

The particle speed vector can be resolved in two components: one component $V'_p$ along the airplane speed vector, and the other component $V_p$ perpendicular to the airplane speed vector. The equations for A will be as follows:

(8) $$R' = -(V_a - V'_p) = -V'_a$$

Integrating (8), (9) $$R = R_0 - V'_a t$$

(10) $$A = \frac{h}{R} = \frac{h}{R_0 - V'_a t}$$

The distance $h$ and the associated sighting angle A for every particle can be resolved into two components: $h_1$ along the particle speed component $V_p$, and $h_2$ perpendicular to $V_p$. Then the following relations for $h_1$ and $h_2$ exist:

(11) $$h_1 = h_{1_0} + V_p t$$

(12) $$h_2 = h_{2_0}$$

(13) $$A_1 = \frac{h_1}{R} = \frac{h_{1_0} + V_p t}{R_0 - V'_a t} = -\frac{V_p}{V'_a} + \frac{h_{1_0} + \frac{V_p}{V'_a} R_0}{R_0 - V'_a t}$$

(14) $$A_2 = \frac{h_2}{R} = \frac{h_{2_0}}{R_0 - V'_a t}$$

A particle with the coordinates $$h_{1_0} = -\frac{V_p}{V'_a}$$

$R_0$ and $h_{2_0} = 0$ will appear stationary to the camera with a sighting angle $$A_1 = -\frac{V_p}{V'_a}$$

For any other set of values $h_{1_0}$ and $h_{2_0}$, the sighting angle components $A_1$ and $A_2$ will appear to increase proportionally with and in the direction of $$h_{1_0} + \frac{V_p}{V'_a}$$

$R_0$ and $h_{2_0}$, respectively. This is the same type of motion as in Case I, except that the center will shift from the point with the coordinates (0, 0) in Case I to the point with coordinates $$\left(-\frac{V_p}{V'_a}, 0\right)$$

in Case II. Therefore, when the center point is used in measuring the angles of attack and skid a correction for this point of $$\frac{V_p}{V'_a}$$

added in the direction of $V_p$ will be required.

CASE III

The particles are stationary in space and the airplane is flying with a constant speed and turning with a constant angular rate.

Referring to Fig. 4, which shows the geometry involved, the particle distance $h$ from the flight path can again be resolved into two components: $h_1$ parallel to the turning plane of the airplane, and $h_2$ perpendicular to it. In this figure, $s'$ is the rate of turn of the airplane, $r$ is the radius of turn of the airplane, and L is the airplane's arcuate flight path. The distance $d$ is the projected distance covered by the airplane in moving from point 0 to point 0' along its arc L.

The following relations are derived from Fig. 4:

(15) $$r = \frac{V_a}{s'}$$

(16) $$\frac{r - d}{r} = \cos(s't)$$

(17) $$d = r(1 - \cos(s't)) = 2r \sin^2\left(\frac{s't}{2}\right) = \frac{2V_a}{s'} \sin^2\left(\frac{s't}{2}\right) \approx \frac{1}{2} V_a s' t^2$$

for small angles of $s't$.

(18) $$R' = -V_a$$

(19) $$R = R_0 - V_a t$$

(20) $$h_1 = h_{1_0} - d - R(s't) = h_{1_0} - \tfrac{1}{2} V_a s' t^2 - (R_0 - V_a t)(s't) = h_{1_0} - R_0 s' t + \tfrac{1}{2} V_a s' t^2$$

(21) $$h_2 = h_{2_0}$$

(22) $$A_1 = \frac{h_1}{R} = \frac{h_{1_0} - R_0 s' t + \tfrac{1}{2} V_a s' t^2}{R_0 - V_a t}$$

(23) $$A_2 = \frac{h_{2_0}}{R_0 - V_a t}$$

Let T be the time at the end of a frame exposure. The sighting angle at that time will therefore be:

(24) $$A_{1T} = \frac{h_{1_0} - R_0 s' T + V_a s' T^2}{R_0 - V_a T}$$

(25) $$A_{2T} = \frac{h_{2_0}}{R_0 - V_a T}$$

Inspecting Equation 22, it can be seen that there exists no value for $h_{1_0}$ for which angle $A_1$ would be a constant during the whole exposure time of a frame. Therefore, there will not exist a precise fixed center on the photograph. The object now is to show that although there does not exist a mathematically fixed center there is a point on each frame which will have a negligible amount of motion and which may be used as the required fixed point. This point, as will be shown later, is the one which will be at the end of the exposure at the same sighting angle as at the beginning of the exposure. Therefore:

(26) $$A_{1_0} = A_{1T}$$

or

(27) $$\frac{h_{1_0}}{R_0} = \frac{h_{1_0} - R_0 s' T + \tfrac{1}{2} V_a s' T^2}{R_0 - V_a T}$$

and

(28) $$h_{1_0} = \frac{R_0 s'}{V_a}(R_0 - \tfrac{1}{2} V_a T)$$

The condition for $h_{2_0}$ is the same as in Case I and $h_{2_0} = 0$ results in $A_2 = 0$ throughout the whole exposure time. The variation of $A_1$ with time for the condition $A_{1_0} = A_{1T}$ is roughly as shown in Fig. 7.

To prove that the condition $A_{1_0} = A_{1T}$ results in a minimum variation for $A_1$, first solve for $A_1$, minimum, during the interval zero to T.

For $A_1$ to be a minimum:

(29) $$\frac{dA_1}{dt} = \frac{(-R_0 s' + V_a s' t)(R_0 - V_a t) + (h_{1_0} - R_0 s' t + \tfrac{1}{2} V_a s' t^2) V_a}{(R_0 - V_a t)^2} = 0$$

which reduces to:

(30) $$V_a^2 s' t^2_{\min} - 2 R_0 V_a s' t_{\min} + 2 R_0^2 s' - 2 h_{1_0} V_a = 0$$

and

(31) $$t_{\min} = \frac{R_0 \sqrt{\frac{2 h_{1_0} V_a}{s'} - R_0^2}}{V_a}$$

Inserting this value for $t$ into Equation 22:

(32) $$A_{1 \min} = \frac{s'}{V_a} \sqrt{\frac{2 h_{1_0} V_a}{s'} - R_0^2}$$

Inserting the value of $h_{1_0}$ from Equation 28 into Equation 32:

(33) $$A_{1 \min} = \frac{s'}{V_a} \sqrt{2 R_0 (R_0 - \tfrac{1}{2} V_a T) - R_0^2} = \frac{s'}{V_a} \sqrt{R_0^2 - R_0 V_a T}$$

The difference between $A_{1_0}$ and $A_{1 \min}$ is:

(34) $$A_{1_0} - A_{1 \min} = \frac{h_{1_0}}{R_0} - \frac{s'}{V_a} \sqrt{R_0^2 - R_0 V_a T} = \frac{s'}{V_a}(R_0 - \tfrac{1}{2} V_a T - \sqrt{R_0^2 - R_0 V_a T})$$

Since $A_{1T} = A_{1 \min}$,

(35) $$A_{1T} - A_{1 \min} = \frac{s'}{V_a}(R_0 - \tfrac{1}{2} V_a T - \sqrt{R_0^2 - R_0 V_a T})$$

To prove that Equation 28 results in a minimum amount of change in $A_1$, it is assumed that:

(36) $$h_{1_0} = \frac{R_0 s'}{V_a}(R_0 - \tfrac{1}{2} V_a T + e)$$

where $e$ would be a small variation in $h_{1_0}$. Then:

(37) $$A_{1 \min} = \frac{s'}{V_a} \sqrt{\frac{2 h_{1_0} V_a}{s'} - R_0^2} = \frac{s'}{V_a} \sqrt{R_0^2 - R_0 V_a T + 2 R_0 e}$$

and

(38) $$A_{1_0} - A_{1 \min} = \frac{s'}{V_a}(R_0 - \tfrac{1}{2} V_a T + e - \sqrt{R_0^2 - R_0 V_a T + 2 R_0 e}) \approx \frac{s'}{V_a}\left((R_0 - \tfrac{1}{2} V_a T - \sqrt{R_0^2 - R_0 V_a T}) + \left(1 - \frac{R_0}{\sqrt{R_0^2 - R_0 V_a T}}\right) e\right)$$

But $$1 - \sqrt{\frac{R_0}{R_0^2 - R_0 V_a T}}$$

in Equation 38 is negative and therefore $e$ has to be positive in order to reduce the difference $A_{1_0} - A_{1 \min}$ given in Equation 34.

Condition 36 will result in a difference of $A_{1T} - A_{1 \min}$ as follows:

(39) $$A_{1T} - A_{1 \min} = \frac{R_0(s'/V_a)(R_0 - \tfrac{1}{2} V_a T + e) - R_0 s' T + \tfrac{1}{2} V_a s' T^2}{R_0 - V_a T} - \frac{s'}{V_a} \sqrt{R_0^2 - R_0 V_a T + 2 R_0 e}$$

or

(40) $$A_{1T} - A_{1 \min} \approx \frac{s'}{V_a}\left((R_0 - \tfrac{1}{2} V_a T - \sqrt{R_0^2 - R_0 V_a T}) + R_0\left(\frac{1}{R_0 - V_a T} - \frac{1}{\sqrt{R_0^2 - R_0 V_a T}}\right) e\right)$$

But $$\left(\frac{1}{R_0 - V_a T} - \frac{1}{\sqrt{R_0^2 - R_0 V_a T}}\right)$$

in Equation 40 is positive and therefore $e$ has to be negative in order to reduce the difference $A_{1T} - A_{1 \min}$ given in Equation 35.

The requirement that the larger of the differences of $(A_{1_0} - A_{1 \min})$ and $(A_{1T} - A_{1 \min})$ be a minimum and using Equations 34, 35, 38 and 40, results in the condition that $e$ in Equation 36 has to be equal to zero.

Assuming that the reference center is halfway between $A_{1_0} - A_{1 \min}$ and using Equations 28 and 33 there is developed the following required correction when the airplane is turning:

(41)
$$\text{Corr.} = -(A_{1_0} - \tfrac{1}{2}(A_{1_0} - A_{1\min.})) = -\tfrac{1}{2}(A_{1_0} + A_{1\min.}) = -\frac{s'}{2V_a}(R_0 - \tfrac{1}{2}V_aT + \sqrt{R_0^2 - R_0V_aT})$$

which is away from the direction of turn of the airplane.

If the difference between $A_{1_0}$ and $A_{1\min.}$ is negligible the required correction will be as follows:

(42) $\quad \text{Corr.} = -A_{1_0} = -\dfrac{s'}{V_a}(R_0 - \tfrac{1}{2}V_aT)$

The following are two examples to show the variation in $A_1$ during the time interval zero to T:

*Example 1*

$V_a = 416$ ft./sec.
$g = 32$ ft./sec.$^2$
$a_c = V_a s' = 4g$, centrifugal acceleration
$T = \tfrac{1}{20}$ sec.
$R_0 = 35$ ft.

For calculating the variation in $A_1$, Formula 34 may be rewritten as follows:

(43)
$$A_{1_0} - A_{1\min.} = A_{1T} - A_{1\min.} = \frac{s'}{V_a}(R_0 - \tfrac{1}{2}V_aT - \sqrt{R_0^2 - R_0V_aT}) = \frac{a_c T^2}{4(R_0 - \tfrac{1}{2}V_aT + \sqrt{R_0^2 - R_0V_aT})}$$

Inserting the values of Example 1:

$A_{1_0} - A_{1\min.} = A_{1T} - A_{1\min.} = 1.7$ milliradians

*Example 2*

$V_a = 512$ ft./sec.
$g = 32$ ft./sec.$^2$
$a_c = V_a s' = 4g$
$R_0 = 20$ ft.
$T = \tfrac{1}{64}$ sec.

Inserting the values of Example 2 in Equation 43 the answer obtained is .25 milliradian.

The required corrections for Examples 1 and 2 as given by Formula 41 are −17.3 milliradians, −7.7 milliradians, respectively.

The two examples show that the amount of motion of the central point is negligible in all normal cases and is still very small in extreme cases like in Example 1. Therefore, it is apparent that the pattern on the film for a maneuvering airplane will appear to be very much the same as for a non-maneuvering airplane.

CASE IV

If the particles are falling due to gravity with the constant speed $V_p$ and the airplane is making a horizontal right turn with a constant angular rate $s'$ and a constant horizontal speed $V_a$, the combined required correction will be:

(1) $\quad \dfrac{V_p}{V_a}$ downward and (2) $\quad \dfrac{s'}{2V_a}(R_0 - \tfrac{1}{2}V_aT + \sqrt{R_0^2 - R_0V_aT})$ to the left.

Figure 5:
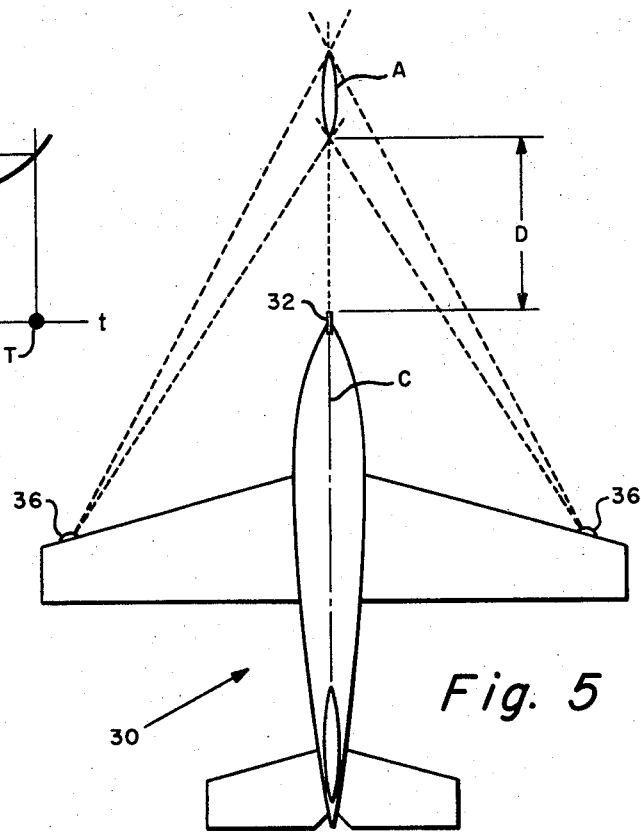
Fig. 5 shows one typical arrangement for carrying out the instant invention.
Figure 6:
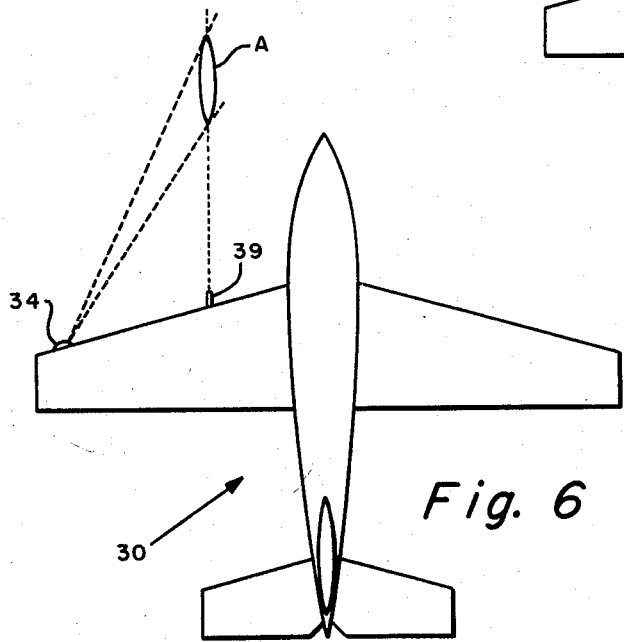
Fig. 6 shows an alternative arrangement for carrying out the invention.

Fig. 5 shows a typical arrangement for carrying out the principles of this invention. Aircraft 30 is provided with a camera 32 which is aligned with the bore-sight-datum line C of the airplane. A pair of lights 34 and 36 mounted on the wings of the aircraft direct a pair of beams into a designated area at some predetermined distance ahead of the aircraft. The distance D between the front of the aircraft and the closest point of the illuminated area should be as short as possible in order to obtain good pictures of the particles and yet far enough away to prevent local interference of the particles by the aircraft. By this arrangement, particles suspended in area A will be fully illuminated by lights 34 and 36 so that camera 32 may obtain a picture over a finite interval of the particles as the aircraft flies through this medium. A modified arrangement, with camera 32 mounted in the wing of the aircraft, is shown in Fig. 6.

A typical arrangement would utilize a 35 mm. Mitchell camera. The camera may be provided with a ten-inch lens having a diaphragm (aperture) setting of F/8 and a film speed of 16 frames/sec. The disc opening would be 90 degrees so that the actual exposure time is $\tfrac{1}{64}$ of a second. The camera is focused at the distance D equal to 20 ft. For these conditions, the camera will produce a sharp picture between the dimensions of 16' 9" (D) and 24' 9" amounting to a field depth of 8 ft. A particle suspended in the air mass would traverse this air 8 ft. field, relative to the airplane, in $\tfrac{1}{64}$ of a second when the true airplane speed is 512 ft. per second, which is roughly 300 knots. It is believed that in order to see better the suspended particles within the 8 ft. field depth, they should be well illuminated only within the 8 ft. field.

Reticle Q shown in Fig. 2 may be etched on a reflector glass placed in front of the camera or may be in a small mirror or prism to superimpose the cross hair focused at 20 ft. away, point Q representing a sight on the bore-sight-datum line of the airplane. Any other suitable method may be used.

In the practical operation of this invention, the airplane should fly through a medium of small particles which are photographed by the camera mounted on the aircraft and focused at some distance ahead as described. The suspended particle source to be used may be of natural origin, such as snow, slow falling rain droplets, fog or cloud banks; or, sources of particles of an artificial nature may be used. One disadvantage of the natural type source of particles is that their existence is a function of weather conditions and would not, therefore, be too dependable. An artificial particle source could be used, the example of one such type source might be the vapor trail of an airplane flying at high altitude. Other artificial sources which might be feasible would be the release of little smoke puffs from a number of pipes located in the wings and tail of an airplane flying ahead of the airplane undergoing measurement, or the release of physical particles, such as pieces of paper from an aircraft flying ahead. Under ordinary bright conditions, the lighting may be dispensed with altogether, the camera being properly focused for the correct area.

There has thus been provided a novel method of utmost simplicity capable of measuring the angles of attack and skid of an aircraft under a variety of conditions heretofore considered to be impractical.

Obviously many variations in the present invention are possible in the light of the above teachings. It is therefore to be understood that within the scope of the appended claims the invention may be practiced otherwise than as specifically described.

What is claimed is:

1. The method of determining the angles of attack and skid for an aircraft which comprises the steps of flying said aircraft through a medium of suspended particles, recording a projected tracing of said particles in an area in front of said aircraft over a predetermined interval of time thereby producing a plurality of streaks caused by said particles, said streaks extending from an apparent center representing a point on the true path of said aircraft, and measuring the separation between said apparent center and a point representing a point on the axis of said aircraft from which said angles are measured for calculating the values of said angles of attack and skid.

2. The method of determining the angles of attack and skid for an aircraft which comprises the steps of flying said aircraft through a medium of suspended particles, exposing a photographic plate to an area in front of said aircraft over a predetermined interval of time thereby producing a plurality of streaks caused by said particles, said streaks extending from an apparent center representing a point on the true path of said aircraft, and measuring the separation between said apparent center and a point on said plate representing a point on the axis of said aircraft from which said angles are measured for calculating the values of said angles of attack and skid.

3. The method of determining the angles of attack and skid for an aircraft which comprises the steps of flying said aircraft through a natural medium of suspended particles, exposing a photographic plate to an area in front of said aircraft over a predetermined interval of time thereby producing a plurality of streaks caused by said particles, said streaks extending from an apparent center representing a point on the true path of said aircraft, and measuring the separation between said apparent center and a point on said plate representing a point on the axis of said aircraft from which said angles are measured for calculating the values of said angles of attack and skid.

4. The method of determining the angles of attack and skid for an aircraft which comprises the steps of flying said aircraft through an artificial medium of suspended particles, exposing a photographic plate to an area in front of said aircraft over a predetermined interval of time thereby producing a plurality of streaks caused by said particles, said streaks extending from an apparent center representing a point on the true path of said aircraft, and measuring the separation between said apparent center and a point on said plate representing a point on the axis of said aircraft from which said angles are measured for calculating the values of said angles of attack and skid.

5. The method of determining the angles of attack and skid for an aircraft which comprises the steps of flying said aircraft at a constant speed and a straight line through a medium of suspended particles, recording a projected tracing of said particles in an area in front of said aircraft over a predetermined interval of time thereby producing a plurality of streaks caused by said particles, said streaks extending from an apparent center representing a point on the true path of said aircraft, and measuring the separation between said apparent center and a point representing the axis of said aircraft from which said angles are measured for calculating the values of said angles of attack and skid.

6. The method of determining the angles of attack and skid for an aircraft which comprises the steps of flying said aircraft through an artificial medium of suspended particles in motion, exposing a photographic plate to an area in front of said aircraft over a predetermined interval of time thereby producing a plurality of streaks caused by said particles, said streaks extending from an apparent center representing a point on the true path of said aircraft, measuring the separation between said apparent center and a point representing the axis of said aircraft from which said angles are measured for calculating the values for said angles of attack and skid, and applying a correction factor based upon the magnitude and direction of the motion of said particles to said values for compensating for errors due to particle motion.

7. The method of determining the angles of attack and skid for an aircraft which comprises the steps of flying said aircraft at a constant speed and turning with a constant angular rate through a medium of substantially stationary suspended particles, exposing a photographic plate to an area in front of said aircraft over a predetermined interval of time thereby producing a plurality of streaks caused by said particles, said streaks extending from an apparent center representing a point on the true path of said aircraft, and measuring the separation between said apparent center and a point indicating the axis of said aircraft from which said angles are measured for calculating the values for said angles of attack and skid.

8. The method of determining the angles of attack and skid for an aircraft which comprises the steps of flying said aircraft at a constant speed and turning with a constant angular rate through an artificial medium of suspended particles, exposing a photographic plate to an area in front of said aircraft over a predetermined interval of time thereby producing a plurality of streaks caused by said particles, said streaks extending from an apparent center representing a point on the true path of said aircraft, and measuring the separation between said apparent center and a point indicating the axis of said aircraft from which said angles are measured for calculating the magnitudes of said angles of attack and skid.

9. The method of determining the angles of attack and skid for an aircraft which comprises the steps of flying said aircraft at a constant speed and turning with a constant angular rate through a medium of relatively stationary suspended particles, exposing a photographic plate to an area in front of said aircraft over a predetermined interval of time thereby producing a plurality of streaks caused by said particles, said streaks extending from an apparent center representing a point on the true path of said aircraft, measuring the separation between said apparent center and a point indicating the axis of said aircraft from which said angles are measured for calculating the values for said angles of attack and skid, and applying a correction factor based upon the magnitude and direction of the angular motion of said aircraft to said values for compensating for errors due to said turning.

10. The method of determining the angles of attack and skid for an aircraft which comprises the steps of flying said aircraft through a medium of falling suspended particles, exposing a photographic plate to an area in front of said aircraft over a predetermined interval of time thereby producing a plurality of streaks caused by said particles, said streaks extending from an apparent center representing a point on the true path of said aircraft, measuring the separation between said apparent center and a point indicating the axis of said aircraft from which said angles are measured for calculating the values for said angles of attack and skid, and correcting said values to compensate for errors introduced by the falling action of said particles.

References Cited in the file of this patent

UNITED STATES PATENTS

| | | |
|---|---|---|
| 2,378,182 | Burrell | June 12, 1945 |
| 2,603,695 | Campbell | July 15, 1952 |
| 2,779,233 | Dodge et al. | Jan. 29, 1957 |

UNITED STATES PATENT OFFICE
Certificate of Correction

Patent No. 2,872,809             February 10, 1959

Raphael O. Yavne

It is hereby certified that error appears in the printed specification of the above numbered patent requiring correction and that the said Letters Patent should read as corrected below.

Column 2, line 19, for "obserper" read —observer—; column 4, lines 13 to 16, the equation should read $$(13) \quad A_1 = \frac{h_1}{R} = \frac{h_{10} + V_p t}{R_0 - V_a' t} = -\frac{V_p}{V_a'} + \frac{h_{10} + \frac{V_p}{V_a'} R_0}{R_0 - V_a' t}$$

column 4, lines 26 to 28, the equation should read $$A_1 = -\frac{V_p}{V_a'} \quad \text{and} \quad A_2 = 0$$

column 6, lines 36 to 38, should read $$1 - \frac{R_0}{\sqrt{R_0^2 - R_0 V_a T}}$$

line 73, for

"$A_{1_0} - A_1 \text{ min.}$"     read     —$A_{1_0}$ and $A_1$ min.—.

Signed and sealed this 25th day of August 1959.

[SEAL]

Attest:

KARL H. AXLINE,
*Attesting Officer.*

ROBERT C. WATSON,
*Commissioner of Patents.*